US012595068B2

(12) United States Patent
Valleroy et al.

(10) Patent No.: US 12,595,068 B2
(45) Date of Patent: Apr. 7, 2026

(54) BLOCKER DOOR FOR AN AIRCRAFT THRUST REVERSER

(71) Applicant: SAFRAN NACELLES, Gonfreville-l'orcher (FR)

(72) Inventors: Laurent Georges Valleroy, Moissy-Cramayel (FR); Bertrand Léon Marie Desjoyeaux, Moissy-Cramayel (FR); François Bellet, Moissy-Cramayel (FR); Mattias Mesmin, Moissy-Cramayel (FR); Mathieu François Eric Preau, Moissy-Cramayel (FR)

(73) Assignee: SAFRAN NACELLES, Gonfreville-l'orcher (FR)

( * ) Notice: Subject to any disclaimer, the term of this patent is extended or adjusted under 35 U.S.C. 154(b) by 0 days.

(21) Appl. No.: 18/873,392

(22) PCT Filed: Jun. 20, 2023

(86) PCT No.: PCT/FR2023/050925
§ 371 (c)(1),
(2) Date: Dec. 10, 2024

(87) PCT Pub. No.: WO2023/247893
PCT Pub. Date: Dec. 28, 2023

(65) Prior Publication Data
US 2026/0008553 A1      Jan. 8, 2026

(30) Foreign Application Priority Data
Jun. 22, 2022    (FR) ........................................ 2206132

(51) Int. Cl.
B64D 29/00        (2006.01)
B64D 33/02        (2006.01)

(52) U.S. Cl.
CPC ...... B64D 29/00 (2013.01); *B64D 2033/0206* (2013.01)

(58) Field of Classification Search
CPC ... B64D 29/00; B64D 2033/0206; F02K 1/62; F02K 1/625; F02K 1/70; F02K 1/72;
(Continued)

(56) References Cited

U.S. PATENT DOCUMENTS

| | | | | |
|---|---|---|---|---|
| 2010/0212998 A1* | 8/2010 | Valleroy | ................. | B32B 3/266 428/116 |
| 2016/0215700 A1* | 7/2016 | Yu | .......................... | B64D 33/02 |

(Continued)

FOREIGN PATENT DOCUMENTS

| | | |
|---|---|---|
| EP | 3 128 163 A1 | 2/2017 |
| EP | 3 361 082 A1 | 8/2018 |

(Continued)

OTHER PUBLICATIONS

International Search Report issued Oct. 25, 2023 in PCT/FR2023/050925, filed on Jun. 20, 2023, 2 pages.

*Primary Examiner* — Richard Green
*Assistant Examiner* — Katherine June Walter
(74) *Attorney, Agent, or Firm* — Oblon, McClelland, Maier & Neustadt, L.L.P.

(57)        ABSTRACT

A blocker door for a thrust reverser includes: a structural frame which is configured to ensure the mechanical strength of the blocker door; an alveolar core; and an acoustically porous resistive skin which is intended to be located on the air flow side. The structural frame covers less than 50% of the surface of the resistive skin and is kept at a distance from the resistive skin. This separation between the structural frame and the resistive skin makes it possible to improve the impact behavior of the blocker door. The resistive skin and the alveolar core preferably form a one-piece subassembly
(Continued)

into which the structural frame fits. The door may be devoid
of a rear skin.

11 Claims, 6 Drawing Sheets

(58) Field of Classification Search
CPC ... F02K 1/827; F02K 1/58; F02K 1/60; F05D
2260/96
See application file for complete search history.

(56) References Cited

U.S. PATENT DOCUMENTS

| | | | | |
|---|---|---|---|---|
| 2018/0056554 A1* | 3/2018 | Gaw | ........................ | B29C 43/50 |
| 2020/0003124 A1* | 1/2020 | Curaudeau | ............. | B64D 29/00 |
| 2021/0102513 A1* | 4/2021 | Le Boulicaut | .......... | F02K 1/827 |

FOREIGN PATENT DOCUMENTS

| | | | | |
|---|---|---|---|---|
| FR | | 3 058 672 A1 | 5/2018 |
| FR | | 3 081 510 A1 | 11/2019 |
| WO | WO 2018/087502 A1 | 5/2018 |

* cited by examiner

BLOCKER DOOR FOR AN AIRCRAFT THRUST REVERSER

TECHNICAL FIELD

The present application relates to thrust reversers for an aircraft engine nacelle. The invention relates more precisely to a blocker door particularly adapted to thrust reversers of the type with screens and sliding cover. The invention can however also apply to other types of thrust reverser.

PRIOR ART

A nacelle of a turbofan engine (or other engine) generally has a tubular structure comprising an air inlet upstream of the turbofan engine, a middle section surrounding the fan of the turbofan engine, a downstream section surrounding the combustion chamber of the turbofan engine and generally incorporating a thrust reverser, and an exhaust nozzle the outlet of which is located downstream of the turbofan engine.

In the case of a bypass turbofan engine, the nacelle usually comprises an external structure comprising the air inlet, the middle section, the downstream section and the exhaust nozzle, and a fixed internal structure, concentric with the downstream engine and which surrounds the core of the turbofan engine at the rear of the fan. A bypass turbofan engine generates firstly a hot primary flow that passes through the combustion chamber of the turbofan engine, and secondly a cold secondary flow that comes from the fan and circulates outside the core of the turbofan engine, in an annular channel referred to as a secondary flow duct, formed between the external and internal structures of the nacelle. In direct jet, these two air flows flow overall in a longitudinal direction of the nacelle towards the exhaust nozzle thereof.

In the same way, in a single-flow jet engine, in direct jet, the air flow flows overall in a longitudinal direction of the nacelle towards the exhaust nozzle thereof.

Throughout the description, the upstream and downstream, and likewise the front and rear, of the nacelle or of a part of the nacelle are defined with reference to the direction of flow of the air flow in the nacelle in direct-jet operation, the upstream of the nacelle or of a part thereof corresponding to a zone through which the flow enters (in direct jet) and the downstream corresponding to a zone where said air flow escapes.

The role of a thrust reverser is, when an aircraft lands, to improve the braking capacity thereof by forwardly redirecting at least part of the thrust generated by the engine. In this phase, the reverser obstructs a duct of an air flow that passes through the nacelle, for example the secondary flow duct in which the cold secondary flow circulates (in a bypass turbofan engine) and/or a part of the discharge of the hot primary flow, and redirects the flow in question towards the front of the nacelle, thereby generating a counter-thrust that is added to the braking of the wheels of the aircraft.

The means used for (at least partially) blocker the secondary flow duct, or other duct through which an air flow passes, and reorienting said air flow towards the front of the nacelle vary according to the type of reverser. Reversers with screens and sliding cover and reversers with doors are in particular known.

The invention applies more particularly to reversers with screens and sliding cover. In a reverser with screens, the reorientation of the air flow towards the front is implemented by one or more diversion screens, also called cascades, that encircle a downstream section of the air flow. The reverser can comprise a single diversion screen in the form of a collar or (more generally) several diversion screens each corresponding to an angular sector of the nacelle.

The reverser also includes a sliding cover comprising one or more sets of sliding cowls. Like the diversion screens, the reverser can comprise a single set of cowls in collar form, known by the English term O-duct, or two sets of semicircular cowls, known by the English term C-duct or D-duct, or a larger number of sets of cowls each corresponding to an angular sector of the nacelle.

Each set of cowls is mounted so as to slide in a longitudinal direction parallel to the central axis of the nacelle, between:

a closed forward position of direct-jet operation, in which the cowls provide the aerodynamic continuity of the nacelle and cover the diversion screens so that the air flow is ejected towards the rear, and an open rear position of operation in reverse jet in which the diversion screens are uncovered and at least part of the air flow is re-oriented towards the front of the nacelle through said diversion screens.

In a reverser with screens and sliding cover, the set or sets of sliding cowls therefore aim solely to cover and uncover the diversion screen or screens (which are generally fixed).

Moreover, the flow duct is closed by blocker doors, generally activated by the sliding of the cover, and which allow closure (at least partial) of the flow duct downstream of the diversion screens so as to optimise the reorientation of the flow.

Each blocker door is mounted so as to pivot on the sliding cover and is actuated by a linkage that is articulated firstly on the blocker door and secondly on a fixed element of the nacelle, generally on an element of the fixed internal structure of the nacelle.

When the cover is in the closed forward position of operation in direct jet, the blocker door is in a folded position in which it is inserted in a cavity of the cover and has a face on the flow duct side that extends in aerodynamic extension of the internal face of the cover.

When the cover is in the open downstream position of operation in reverse jet, the blocker door is in a deployed position in which it at least partially closes off the flow duct in order to force the air flow to emerge from the flow duct through the diversion screens.

Throughout the description, the face of a blocker door that extends in the flow duct (and is swept by the air flow when the door is in the direct-jet position) is said to be the face on the flow duct side, and the face of the blocker door that is opposite to the face on the flow duct side is said to be the rear face.

A nacelle must fulfil several fundamental functions, including protection of the engine, optimisation of the air flows of the propulsion unit, management of internal/external temperature differences, absorption of the forces between the engine and the engine pylon, and attenuation of noises from the engine.

To fulfil the latter function, some elements of the nacelle are treated acoustically in order to be able to absorb the sound waves emitted by the engine. This is the case with the blocker doors and at least part of the cover of the thrust reverser.

With regard to the blocker doors, providing blocker doors with acoustic panels having a sandwich structure comprising a central alveolar core, generally consisting of a honeycomb, and two skins that cover the two opposite front faces of the central core is known, said skins usually being made from carbon fabric impregnated with hardened epoxy resin. The skin located on the flow-duct side, termed the resistive skin or acoustic skin, is acoustically porous: it is provided with a lattice of perforations that put the flow duct in communication with the alveoli of the central core to absorb part of the noise produced by the engine. The opposite skin, or so-called rear skin, is generally solid. The central core and the rear skin provide the mechanical strength of the door, while the resistive skin (flow-duct skin) can mainly fulfil only an acoustic function.

To lighten the weight of the blocker doors, FR 3089567 proposes to omit the solid rear skin of said doors. The mechanical strength of the door is then mainly provided by the flow-duct skin and the alveolar structure. Moreover, in order to simplify the manufacture of such blocker doors and to increase the proportion of open surface of the resistive skin (i.e. the percentage of the surface of the flow-duct skin that corresponds to the perforations), FR 3058672 proposes to produce together the alveolar core and the resistive skin by moulding a thermoplastic polymer. In other words, FR 3058672 discloses a blocker door mainly consisting of a single-piece panel that fulfils both the aero-acoustic and structural (mechanical strength) functions.

The drawbacks of such a single-piece panel are its low tolerance to damage, in particular to impacts, as well as a mass/mechanical strength compromise and a mass/cost compromise that are not optimised.

EP 3 128 163 proposes a door in which all the components of the sandwich are assembled around a structural frame. The structural frame comprises ribs extending longitudinally and transversely and incorporates the brackets necessary for hinging and control of the door, as well as attachment lugs. The flow-duct skin is made from fibre-reinforced composite (and is therefore structural). It is pressed against the structural frame and is secured thereto by rivets at the attachment lugs. An alveolar core is housed between the ribs of the structural frame. The rear skin (optional) is secured to the alveolar core, for example because it is obtained by simultaneous moulding with said core or because it is glued thereto by an epoxy resin. The alveolar core/rear skin assembly is secured to the structural frame by rivets.

The blocker door disclosed by EP 3 128 163 has various drawbacks:

all the structural elements of the panel, in particular the structural frame, are subjected to impact;

the attachment zones are also subjected to impact;

the aerodynamic performances are degraded by the presence of the attachments in the flow duct, which cause drag;

the manufacturing method, which includes assembling numerous parts, is particularly expensive.

Finally, FR 3 081 510 discloses a thrust-reverser door consisting of an acoustic panel formed by assembling a front structure and a rear structure. The front structure includes an acoustic front skin and a first lattice of alveolar walls, while the rear structure includes a rear skin and a second lattice of alveolar walls, the first and second lattices of alveolar walls being complementary so as to form, in the assembled position, an alveolar central core. The first lattice of alveolar walls of the front structure is fitted in the second lattice of alveolar walls of the rear structure by means of notches provided in the alveolar walls of the two lattices, the notches of the first lattice being arranged facing the notches of the second lattice in order to be inserted in each other. The front structure and the rear structure are assembled so that the lattice of alveolar walls of one of the structures is spaced apart from the skin of the other structure by a clearance d, the purpose of said clearance being to guarantee correct assembly of the part and to avoid vibrations and/or deformations during use thereof. This clearance is limited, for example less than 2 mm, in order not to degrade the acoustic performances of the alveoli as resonators. It should be noted that the rear skin (from where the second lattice of alveolar walls starts) necessarily extends over the entire surface of the panel so that the alveolar core also covers the entire surface of the acoustic panel.

Whether they are characterised by their single-piece nature or whether they have a sandwich structure, the prior blocker doors previously described all have sensitivity to impact of their structural zones. Moreover, the surfaces that can be treated acoustically are limited. In addition, the production costs are high, as is the mass of the doors.

DESCRIPTION OF THE INVENTION

The invention aims to solve at least one of the aforementioned problems. In particular, one objective of the invention is to improve the impact behaviour of the blocker doors, while proposing lightweight doors that are economical to produce and offer excellent acoustic performances.

To do this, the invention proposes a blocker door for a thrust reverser, preferably of the type with screens and sliding cover, the blocker door comprising:

a structural frame configured to provide, preferably by itself, the mechanical strength of the blocker door, an alveolar core, an acoustically porous resistive skin intended to be located on the same side as a flow duct through which an air flow passes. Hereinafter, this skin is referred to indifferently as flow-duct skin or skin on the flow-duct side or resistive skin.

The blocker door according to the invention is characterised in that the structural frame covers less than 50% of the surface of the resistive skin and in that said structural frame is held at a distance from the resistive skin, said distance hereinafter being referred to as the decoupling distance.

The invention is therefore based on a decoupling between firstly the structure that provides the mechanical strength of the door (the structural frame) and secondly the resistive skin, which is swept by the flow passing through the flow duct and is thereby exposed to any objects liable to damage the blocker door.

Thus, the resistive skin can absorb the impacts caused by objects striking the door in the flow duct. Provided that impact on the resistive skin has a depth less than the decoupling distance, the risks of the structural frame being affected, and therefore weakened, are extremely small. In direct-jet operation, the door may possibly have degraded aerodynamic performances because of the presence of the impact but it continues to hold; in reverse jet, the door can continue to operate in complete safety. If the influence of the impact on drag is acceptable, it is therefore not necessary to provide a maintenance operation for repairing or replacing the damaged blocker door. Furthermore, the damage can easily be viewed.

According to one possible feature of the invention, the decoupling distance is greater than or equal to 1 mm, preferably greater than or equal to 2 mm, or greater than or equal to 5 mm, while the clearance d described in FR 3 081 510, the function of which is in no way to protect the rear structure from impacts suffered by the front structure, is for its part less than 2 mm, or even less than 1.5 mm.

Furthermore, unlike the rear skin of the rear structure of the door disclosed by FR 3 081 510, the structural frame according to the invention does not extend over the entire surface of the door, said frame not participating in the acoustic function of the panel. The restricted dimensions of the structural frame make the blocker door lighter, which is important in the aeronautical field.

According to one possible feature of the invention, the resistive skin is pressed against the alveolar core and is secured thereto, the resistive skin and the alveolar core forming a single-piece subassembly, hereinafter referred to as an aero-acoustic box.

For this purpose, various manufacturing methods can be envisaged. The aero-acoustic box can for example be obtained by moulding or by additive manufacturing, the resistive skin and the alveolar core then being manufactured at the same time. In a variant, the resistive skin and the alveolar core can be manufactured separately and then glued to each other by any suitable means (using an epoxy resin or any other adapted adhesive material), mechanical attachment means that pass through the resistive skin (rivets for example) preferably being excluded since they are liable to cause drag in the flow duct and reduce the acoustic permeable surface.

Preferably, the alveolar core includes partitions that extend projecting from the resistive skin in a direction, referred to as the radial direction, corresponding to the direction of the thickness of the blocker door. According to one possible feature of the invention, the structural frame comprises a body portion extending parallel to the resistive skin, and radial fins extending projecting from the body portion in the radial direction. Said radial fins each have a free edge that preferably extends substantially parallel to the resistive skin.

According to one possible feature of the invention, the partitions of the alveolar core have notches for receiving the fins of the structural frame, said notches having a bottom located at a distance from the resistive skin which, at every point on the notch, is greater than or equal to the decoupling distance, the structural frame thus fitting in the alveolar frame. The minimum distance between the free edge of the fins of the structural frame and the resistive skin therefore corresponds to the decoupling distance when said fins are completely pressed in said notches.

Thus fitted one in the other, the structural frame and the aero-acoustic box are secured together by any suitable means. It is possible to provide rigid punctiform mechanical attachments, such as fasteners (for example clips or brackets) each connecting a fin of the structural frame to a partition of the aero-acoustic box. Using, in a variant, rivets connecting the resistive skin or the acoustic core to the structural frame is not completely excluded.

Any attachment means that does not impact the resistive-skin face on the flow-duct side and therefore does not cause any drag in the flow duct will however be preferred. Thus, for example, spots of glue can be provided at the bottom of some notches of the partitions of the alveolar core. In a variant, deformable lugs or spring clamps (clips) receiving extensions of the structural frame can be formed in the aero-acoustic box (or vice versa) to make it possible to clip the frame onto the aero-acoustic box. Other solutions are possible for securing the structural frame to the aero-acoustic box.

According to one possible feature of the invention, the structural frame also comprises:

two shackles extending projecting in the radial direction of the body portion of the structural frame, said shackles receiving two pivots making a pivot connection between the blocker door and the cover of the thrust reverser, a housing provided in the body portion of the structural frame on the opposite side to the resistive skin, said housing receiving a connecting rod attachment; preferably this is a connecting rod attachment with a spring blade, an aperture in said housing for a connecting rod controlling the blocker door to pass through.

Moreover, according to one possible feature of the invention, the structural frame and/or the alveolar core of the blocker flap comprises, on the opposite side to the resistive skin, a direct-jet door stop, intended to come into abutment against the sliding cover when the door is folded into a direct-jet position.

It should be noted that there may be a plurality (for example two) door stops in the direct-jet position, by means of which the structural frame and/or the alveolar core of the door come into abutment against the sliding cover when the door is in the folded direct-jet position. In general, throughout the description, unless indicated to the contrary, the indefinite article "a" does not mean "one and only one" but "at least one", i.e. "one or more".

In a variant, one or more door stops in the direct jet position are secured to the sliding cover.

According to one possible feature of the invention, the structural frame has a roughly trapezoidal first part comprising:

a downstream plate, in which the housing receiving the connecting rod attachment and the aperture for the connecting rod controlling the blocker door to pass through are provided, two longitudinal ribs, each having a downstream end connected to said downstream plate, and an upstream end located in proximity to an upstream edge of the blocker door, the two previously defined shackles being formed at the upstream ends of said longitudinal ribs.

According to one possible feature of the invention, the structural frame also has an upstream transverse rib that runs along the upstream edge of the blocker door and connects the two shackles or the two longitudinal ribs.

According to one possible feature of the invention, the structural frame also has two tabs on either side of the downstream plate, said tabs each having an end opposite to the downstream plate provided with a door stop in direct-jet mode as previously defined (in a variant, the door stops are secured to the cover facing the ends of said tabs).

According to one possible feature of the invention, the blocker door according to the invention has no rear skin, the expression "rear skin" designating in the usual manner a wall that extends over the entire surface of the blocker door at the rear of the alveolar core (in other words, a wall that covers the entire surface of the resistive skin).

In a variant the blocker door also comprises a wall that extends in a plane of the body portion of the structural frame, parallel to the resistive skin, said wall covering at least 90% of the surface of the alveoli of the alveolar core.

This wall may be a solid wall that forms a rear skin of the blocker door in SDOF (the acronym for "SingleDegree of Freedom") configuration.

It may be a case, in a variant, of a microperforated wall that forms an acoustic septum in 2DOF (the acronym meaning "twoDegrees of Freedom") configuration, the blocker door then comprising a second alveolar core forming a second acoustic attenuation stage, the microperforated wall of the structural frame constituting an intermediate wall interposed between the two alveolar cores. In 2DOF configuration, the locking door can in addition comprise a rear skin, preferably solid, that covers the second alveolar core on the outside of the door.

The invention extends to a thrust reverser of the type with screens and sliding cover, characterised in that it comprises blocker doors as defined above. The invention also extends to a nacelle comprising such a thrust reverser and to a propulsion unit comprising such a nacelle.

Conventionally, the sliding cover comprises an upstream collar against which the blocker doors are folded in the direct-jet position, and this upstream collar includes cavities for receiving the blocker doors, each of said blocker doors coming to be housed, in the direct-jet position, in one of said cavities.

According to one additional possible feature of the invention, the upstream collar comprises, on the flow duct side:
  a grating that extends over the entire circumference of the collar, said grating forming alveoli radially in line with the alveoli of the alveolar core of the blocker doors in the direct-jet position,
  inter-door panels, which cover the grating on the flow duct side between the blocker doors in the direct-jet position and delimit the cavities for receiving the blocker doors; preferably, these inter-door panels are acoustic panels having an acoustically porous face on the flow duct side that extends aerodynamically in line with the resistive skin of the blocker doors in the direct-jet position.

The grating then forms the bottom of each of the cavities receiving the blocker doors.

It is possible to provide macroperforated or microperforated partitions, referred to as septa, at the cavities receiving the blocker doors, between the alveoli of the grating and those of the alveolar core of the blocker doors in the direct-jet position, so that the blocker doors and the upstream collar of the sliding cover form together, when the doors are in the direct-jet position, a two-stage acoustic complex making it possible to effectively attenuate two different noise frequency bands. These septa can be secured:
  either to the blocker doors (each septum is then formed by a macroperforated or microperforated rear skin of the blocker door covering the alveolar core), in which case the grating is open on the flow duct side (i.e. on the blocker door side) at least at the cavities receiving the doors,
  or on the grating (the grating in this case being "closed" on the flow duct side by the septum).

The invention, according to one example embodiment, will be fully understood and its advantages will become clearer upon reading the following detailed description, given as an indicative and non-limiting example, with reference to the appended drawings, wherein:

BRIEF DESCRIPTION OF THE DRAWINGS

Identical elements shown in the aforementioned figures are identified by identical reference numerals.

DETAILED DESCRIPTION

Figure 1:
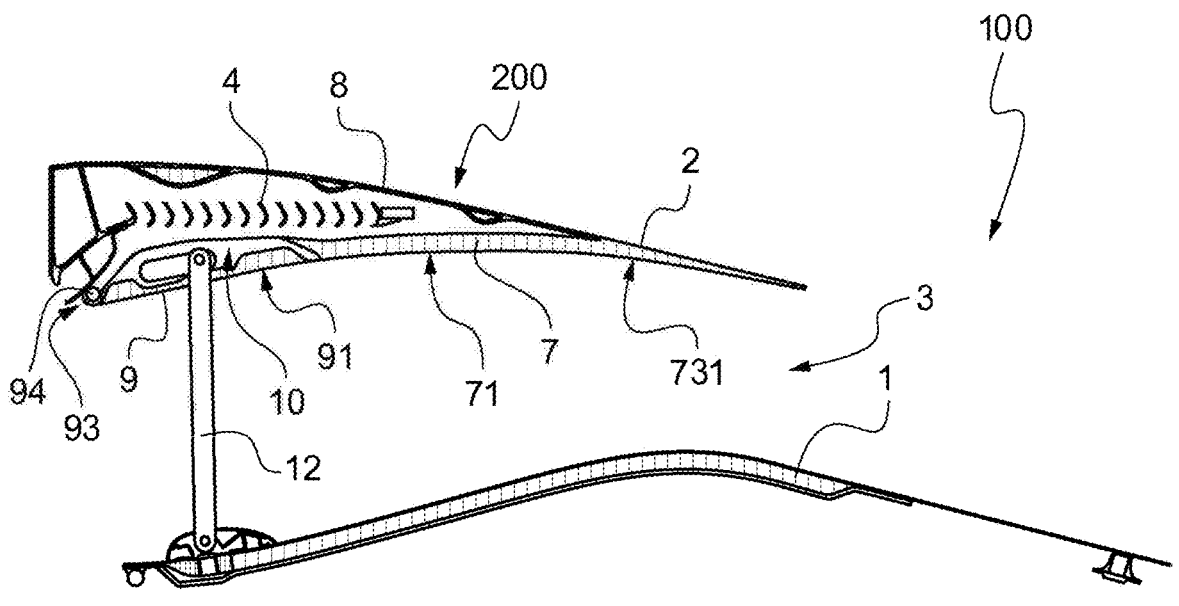
FIG. 1 is a (schematic) longitudinal section of half of a downstream portion of an aircraft nacelle incorporating a thrust reverser according to the invention, with a blocker door in the direct-jet position.
Figure 2:
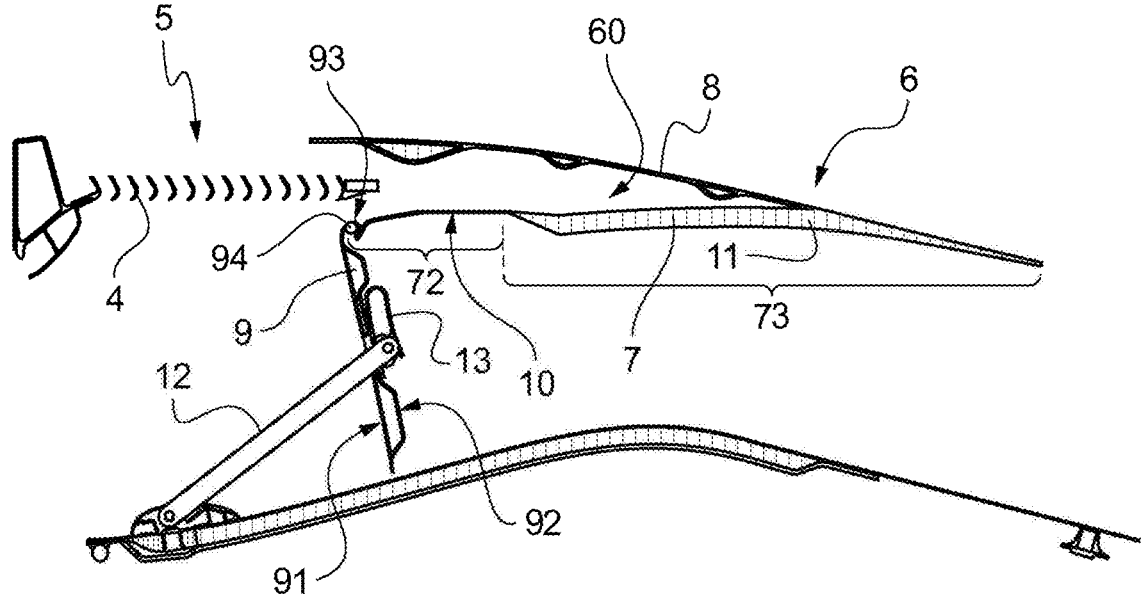
FIG. 2 shows the longitudinal section of FIG. 1 with the blocker door in the reverse-jet position.

FIGS. 1 and 2 show a longitudinal section of half of a downstream portion of an aircraft nacelle 100, which incorporates a thrust reverser 200 of the type with a screen and sliding cover, the expression "longitudinal section" designating a section through a plane, referred to as the longitudinal plane, containing the central axis of the nacelle (which is also the axis of rotation of the engine—not shown—that surrounds the nacelle). In the usual manner, the nacelle 100 comprises a fixed internal structure 1 and an external structure 2, which form between them a flow duct 3 through which an air flow passes, flowing overall in the longitudinal direction, from front to rear of the nacelle.

The external structure 2 of the nacelle incorporates a thrust reverser 200 of the type with screens and sliding cover. The thrust reverser comprises:
  one or more diversion or cascade screens 4, mounted fixedly radially facing an annular opening 5 (see FIG. 2), and
  a cover 6 mounted so as to be able to slide between a closed forward position of operation in direct jet illustrated in FIG. 1, in which the cover 6 closes off the annular opening 5, and an open rear position of operation in reverse jet illustrated in FIG. 2, in which the annular opening 5 is uncovered, the flow duct 3 then communicating with the outside of the nacelle via the diversion screens 4.

It should be noted that the diversion screens can, in a variant, be secured to the sliding cowl and thereby be movable in longitudinal translation in the thrust reverser.

The cover 6 comprises an internal cowl 7 and an external cowl 8, which join and are secured to each other at a downstream end of the cover. Conversely, the interior and exterior cowls are distant radially from each other to the upstream of this downstream connection end, thus forming a tubular housing in which the diversion screens 4 come to be inserted when the cover is in the closed forward position of operation in direct jet.

The thrust reverser also comprises a plurality of blocker doors 9 distributed over the entire circumference of the cover 6. Each blocker door 9 is mounted pivotably at its front edge, about a transverse axis 94, between:

a folded direct-jet position illustrated in FIG. 1, in which the blocker door 9 is inserted in an upstream portion or collar 72 of the internal cowl 7, the face 91 of the door on the flow duct side then extending aerodynamically in line with the internal face 71 of a downstream portion 73 of the internal cowl 7, and a deployed reverse-jet position illustrated in FIG. 2, in which the blocker door 9 extends inside the flow duct 3, the flow duct then being at least partially closed downstream of the diversion screens 4 by all the blocker doors in the reverse-jet position.

The upstream collar 72 of the internal cowl is provided with cavities 10 for receiving the blocker doors in the direct-jet position. Each cavity 10 has a cross-section (form and dimensions) substantially identical (to within a clearance) to that of the door that it receives in the direct jet position.

The downstream portion 73 of the internal cowl is formed by, or covered by, acoustic panels 11 able to absorb the sound waves emitted by the engine.

Each blocker door 9 is pivoted about its axis 94 by means of a control connecting rod 12, a first end of which is articulated on a (fixed) element of the fixed internal structure 1 of the nacelle. The second end of the control connecting rod 12 passes through a passage aperture 148 (see FIGS. 4 and 5) provided in the blocker door and is articulated on a connecting rod fastener 14 with spring blade, secured to the rear face 92 of the blocker door.

Each blocker door (see FIGS. 3 to 7) comprises a structural frame 14, a resistive skin 16 that forms the face 91 of the blocker door on the flow duct side, and an alveolar core 17 having partitions extending substantially radially.

According to the invention, the structural frame 14 and the resistive skin 16 are distant at every point by at least 1 mm in the radial direction, preferably at least 2 mm, or even more than 5 mm, this distance creating a decoupling between the resistive skin 16 and the structural frame 14 that makes said frame insensitive or little sensitive to impact. This distance, termed the decoupling distance, can be observed in FIG. 9, where it is referenced "d".

Figure 4:
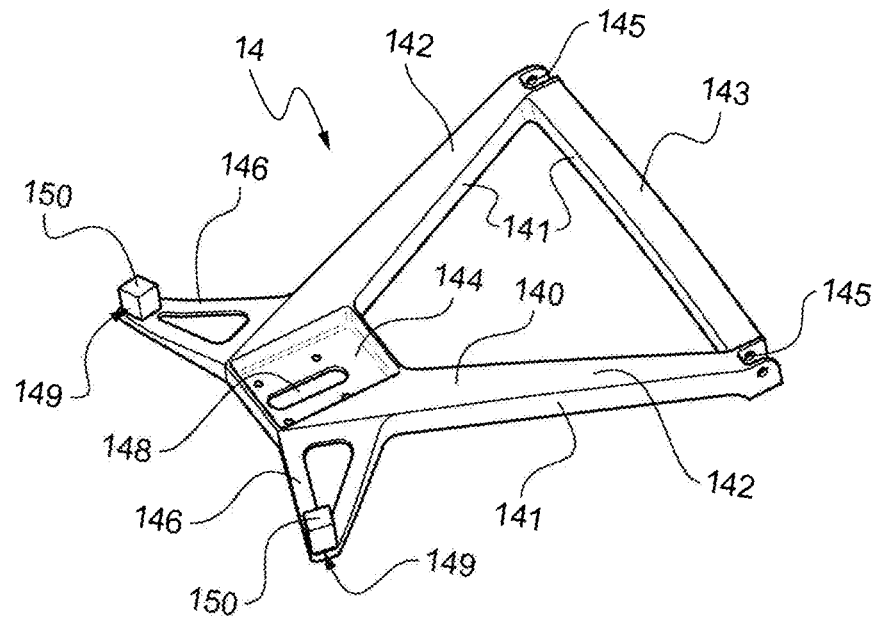
FIG. 4 is a schematic view in perspective of the structural frame of the blocker door of FIG. 3, seen from the rear face of the door.
Figure 5:
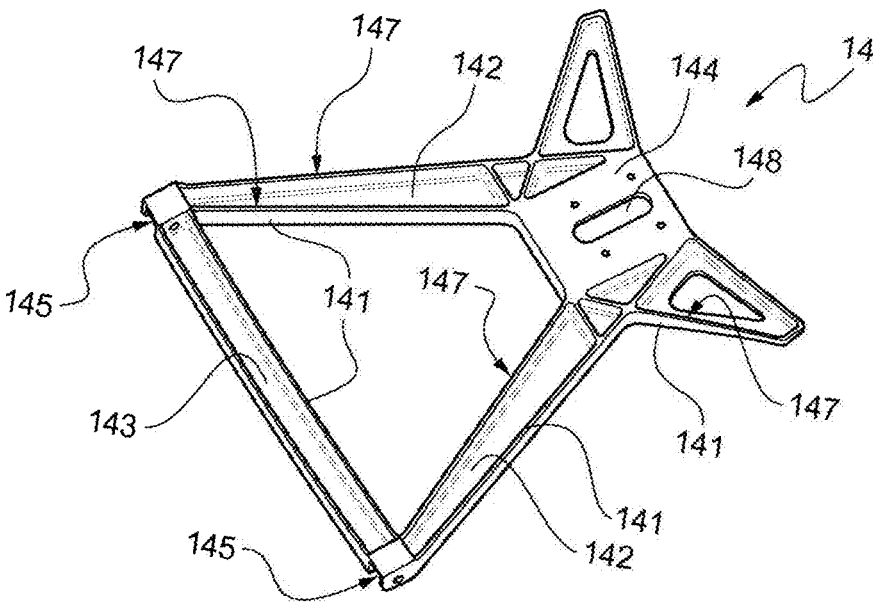
FIG. 5 is a schematic view in perspective of the structural frame of the blocker door of FIG. 3, seen from the face of the door on the flow duct side.
Figure 6:
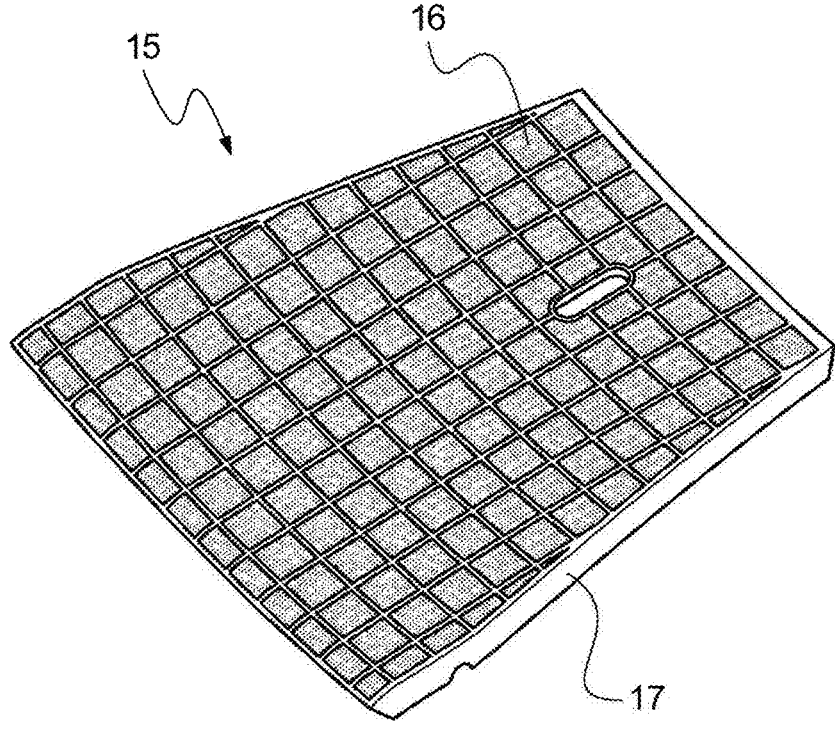
FIG. 6 is a schematic view in perspective of the aero-acoustic box of the blocker door of FIG. 3, seen from the face of the door on the flow duct side.

The structural frame 14 is shown alone on FIGS. 4 and 5, FIG. 4 showing its rear face, FIG. 5 showing its face on the flow duct side. It can comprise a body portion 140 extending parallel to the resistive skin 16 and fins 141 extending radially from the body portion 140 on the same side as the face thereof on the flow duct side, for example along various edges of said body portion 140. Said body portion 140 of the structural frame does not extend over the entire surface of the blocker door; in other words, this body portion 140 has dimensions and a surface area that are smaller compared with those of the resistive skin 16. More precisely, the structural frame or the body portion 140 thereof covers less than 50% of the surface of the resistive skin. In the non-limitative example illustrated, the body portion 140 comprises a first roughly trapezoidal part comprising two longitudinal ribs 142, an upstream transverse rib 143 that forms a large base of the trapezoidal part and a downstream plate 144 that forms the small base of the trapezoidal part.

The upstream transverse rib 143 runs along the upstream transverse edge 93 (see also FIGS. 1 et 2) of the blocker door. This upstream transverse rib 143 is optional.

It should be noted that the structural frame can also comprise a downstream transverse rib (not shown), opposite to the longitudinal ribs 142 with respect to the downstream plate 144, this optional downstream transverse rib running along a downstream edge of the blocker door.

The longitudinal ribs 142 include, at their upstream end, shackles 145, which may be single or double. These shackles 145 receive two aligned pivots (not shown) carried by the internal cowl 7 of the thrust reverser to form the pivot axis 94 (see FIG. 2) of the blocker door.

The longitudinal ribs 142 and upstream transverse ribs 143 have a rear face that extends in one and the same "plane" (which is not necessarily planar in the geometric sense of the term and may on the contrary be curved) parallel to the resistive skin 16. The downstream plate 144 forms a housing recessed (towards the inside of the door) with respect to the plane of the rear face of the ribs 142 and 143. This housing receives the connecting rod attachment 13 of the blocker door. It has a passage aperture 148 for passage of the end of the control connecting rod 12 that is connected to the connecting rod fastener 13.

Figure 3:
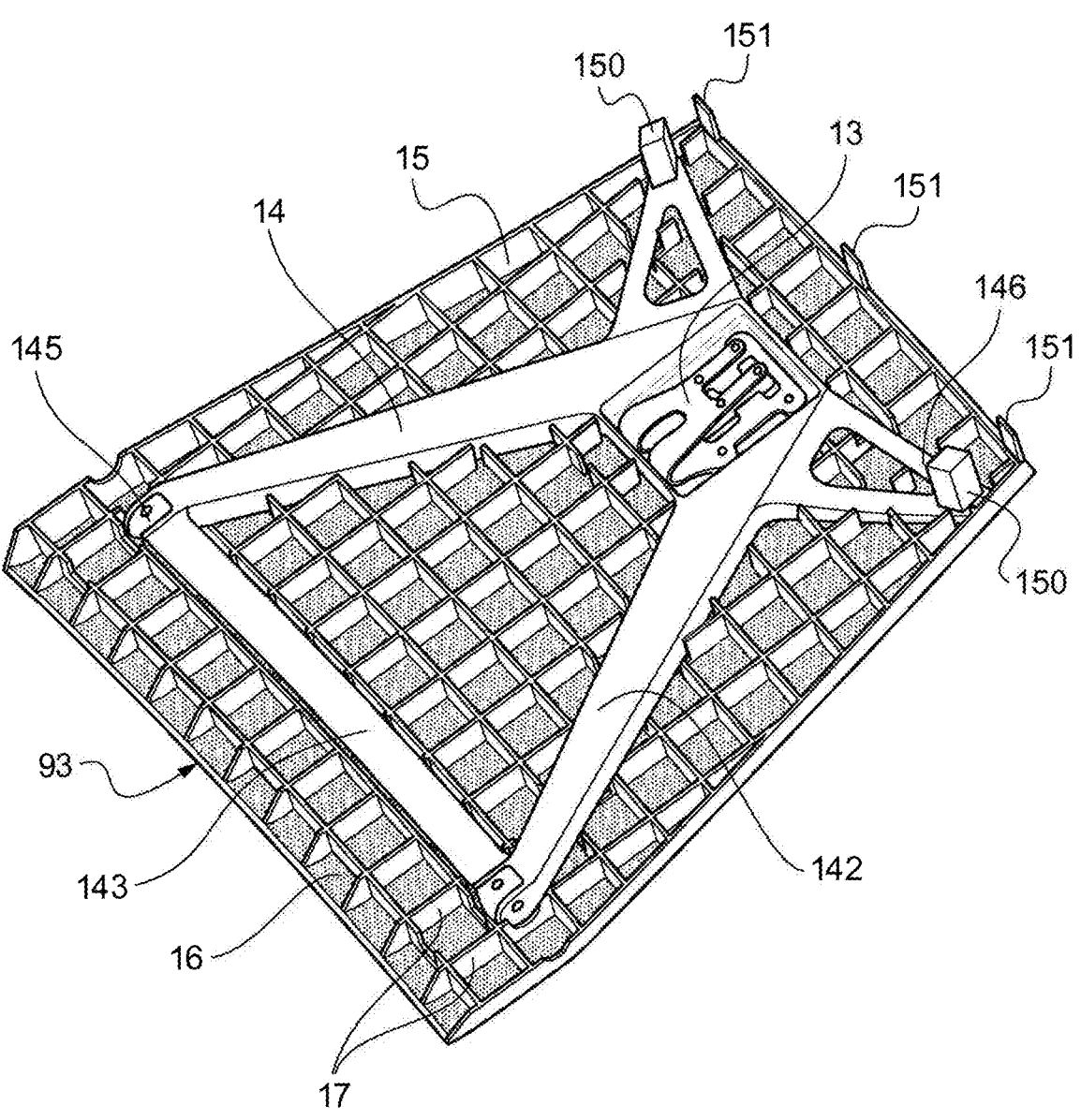
FIG. 3 is a schematic view in perspective of a first embodiment of a blocker door according to the invention, said door being seen from the rear face thereof.

The body portion 140 of the structural frame comprises in addition two tabs 146 transversely on either side of the downstream plate 144. The end 149 of each tab 146 carries a door stop 150 that comes to abut against the bottom of the cavity 10 of the internal cowl 7 in which the blocker door is folded in the direct jet position. In a variant or optionally in combination, door stops 151 are provided on the alveolar core 17, as illustrated in FIG. 3.

Thus the body portion 140 of the frame has the overall form of a star with four arms (the two tabs 146 and the two longitudinal ribs 142), the arms of which extend as far as the four corners of the door from a downstream plate 144 that provides the mechanical reinforcement of the door around the connecting rod fastener; an upstream transverse rib 143 (optional), which reinforces the panel at the pivot axis 94 thereof, can be added to the star.

As indicated previously, the structural frame 14 comprises fins 141 that radially extend the body portion 140 towards the resistive skin 16 of the blocker door. In the example illustrated, its fins extend along and at or in proximity to the edges of the longitudinal 142 and transverse 143 ribs and the tabs 146.

Each fin 141 has, facing the resistive skin, a free edge 147 that is separated from said resistive skin 16 by a decoupling distance d (see FIG. 9) preferably greater than 2 mm. The distance existing between the free edges 147 of the fins and the resistive skin 16 can be the same at every point on said free edges, in which case the free edges of the fins extend in a "plane" (in reality curved) parallel to the resistive skin 16. In a variant, the distance that separates the free edges of the fins and the resistive skin can vary from one point to another on said free edges (it can also differ from one fin to another) while at every point remaining greater than a minimum distance that corresponds to said decoupling distance.

The downstream plate 144 of the body portion can be located in the plane of the free edges 147 of the fins 141 (as in the example illustrated) or in a variant in an intermediate plane between the plane of the free edges 147 and that of the rear face of the ribs 142 and 143.

The resistive skin 16 can be formed by a macroperforated or microperforated rigid partition or by a reinforced fabric or trellis offering the required acoustic permeability.

The alveolar core 17 comprises rigid partitions extending radially outwards (i.e. in a centrifugal radial direction) from the resistive skin 16. The geometric organisation of the partitions and the dimensions and form of the alveoli that these partitions delimit are determined by the acoustic requirements.

Preferably, the resistive skin 16 and the alveolar core 17 are secured to each other or consist of a single piece, which can be obtained by moulding or by 3D printing for example, so as to form a single-piece subassembly 15, preferably self-supporting and rigid, termed aero-acoustic box.

Figure 7:
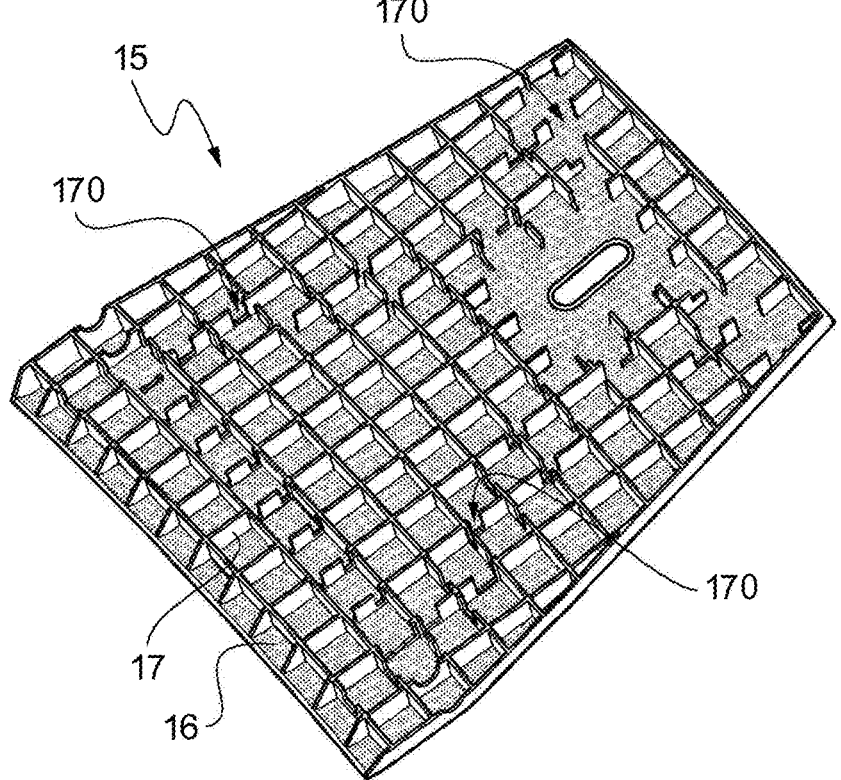
FIG. 7 is a schematic view in perspective of the aero-acoustic box of the blocker door of FIG. 3, seen from the rear face of the door.
Figure 8:
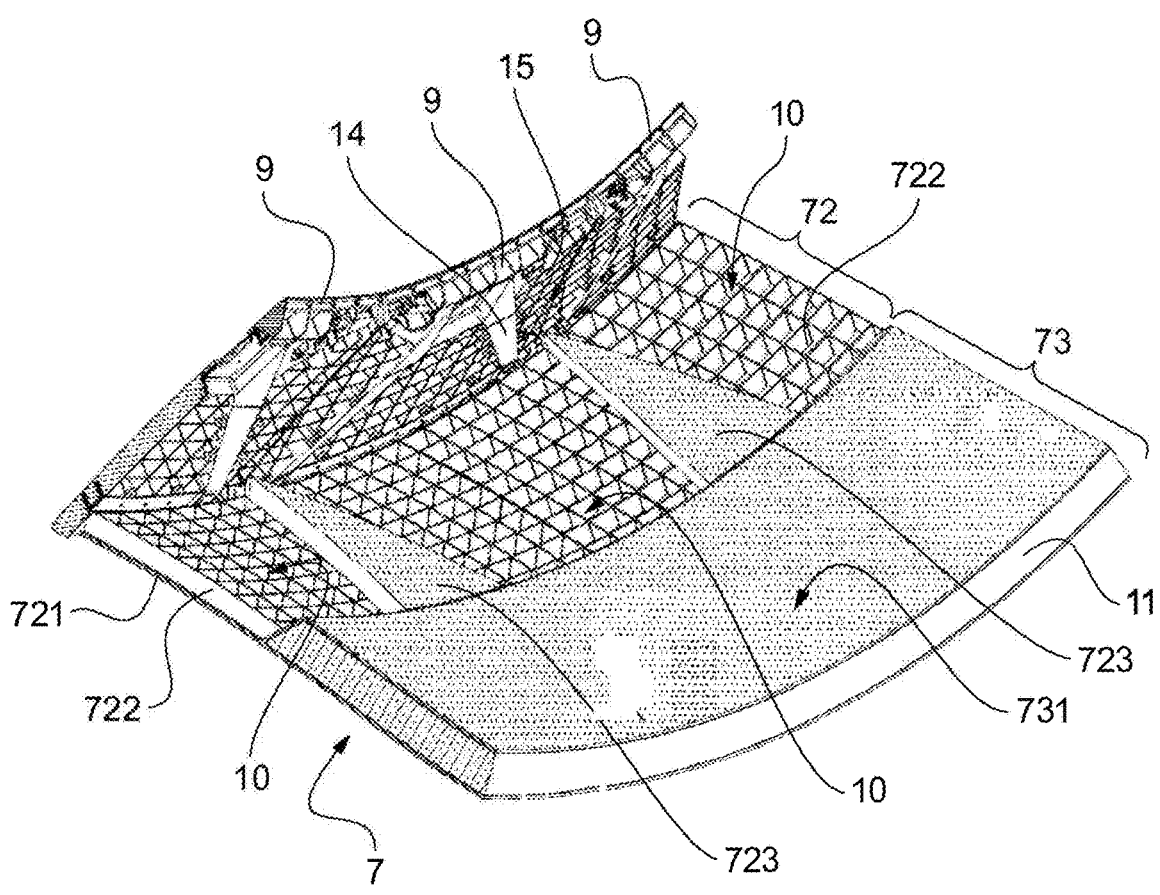
FIG. 8 is a schematic view in perspective of an angular sector of a thrust reverser according to the invention, with blocker doors in the reverse-jet position.
Figure 9:
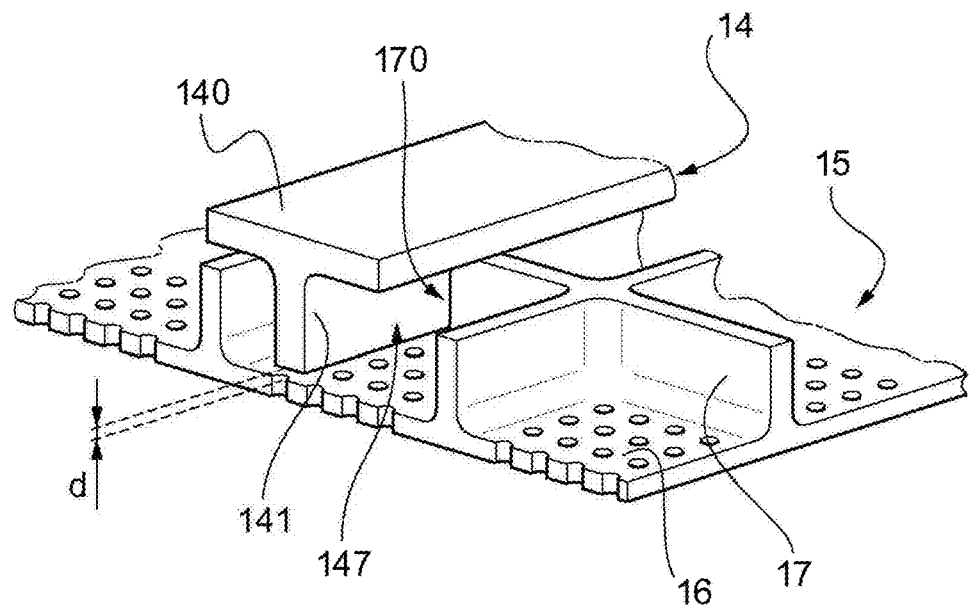
FIG. 9 is a zoom on the interface between the structural frame and the aero-acoustic box of the blocker door of the previous figures, this interface being seen in cross section along a transverse plane and in perspective.

As can be observed on FIGS. 7 and 9, the partitions of the alveolar core have notches 170 that make it possible to fit the structural frame 14 in the alveolar core 17 (the form of the structural frame thus appears as an impression in the alveolar core on FIG. 7). These notches receive the fins 141 of the structural frame. The bottom of the notches 170 is located at a distance from the resistive skin 16 corresponding to the decoupling distance. Thus, when the structural frame 14 is pressed to the maximum extent into the alveolar core 17, the distance separating the resistive skin 16 from the free edge 147 of the fins 141 (which is in abutment on the bottom of the notches 170) is equal to the decoupling distance.

If the free edges of the fins are not located in one and the same plane parallel to the resistive skin, naturally the notches 170 can be of variable depth so that the rear face of the body portion 140 of the frame is parallel to the resistive skin, the distance existing between the bottom of the notches 170 and the resistive skin remaining at least equal to the decoupling distance at every point of the notches.

As can be seen, the blocker door 9 according to the invention comprises a limited number of parts, which makes it possible to reduce the manufacturing costs and the mass thereof. The method for manufacturing such a blocker door is extremely simple. The aero-acoustic box 15 can for example be obtained by a single moulding or 3D printing operation. At the same time, the manufacture of the structural frame 14, which can be metal or made from composite material, also does not pose any difficulties. The connecting rod attachment 13 is secured to the structural frame 14 by any suitable means. The two subassemblies thus obtained are next fitted together and secured to each other by any suitable means, for example by adhesive bonding.

Moreover, the blocker door 9 has an optimised mass/mechanical strength ratio. The mechanical strength of the door being provided by the structural frame 14 alone, the alveolar core 17 can have reduced mass, with thinner partitions, which also makes it possible to increase the proportion of open surface of the resistive skin 16 and to improve the acoustic absorption performances of the door.

Also and especially, by virtue of the decoupling distance d between its resistive skin 16 and its structural frame 14, the blocker door 9 according to the invention is more tolerant of impact than the known prior doors.

FIG. 7 shows an angular sector of the thrust reverser comprising three blocker doors 9 similar to the door previously described, said blocker doors 9 being shown in the reverse-jet position and without their control connecting rod. The internal cowl 7 of the sliding cover of the thrust reverser is found again, and in particular an angular sector of its downstream portion 73 in an acoustic panel 11, as well as an angular sector of its upstream collar 72 provided with cavities 10 (here three in number) for receiving the blocker doors 9.

The upstream collar 72 comprises a rear skin 721 and a grating 722. The grating 722 forms the bottom of the cavities 10. The grating has alveoli that extend radially in line with the alveoli of the alveolar core 17 of the blocker doors when the latter are in the folded direct-jet position (an alveolus of the blocker door preferably corresponding to an alveolus of the grating and vice versa).

A macroperforated or microperforated septum (not shown) can be interposed between the grating and the alveolar core of the door in the direct-jet position to form an acoustic panel with two attenuation stages that can effectively attenuate two distinct noise frequency bands, in particular if the height (the dimension in the radial direction) of the alveoli of the alveolar core of the door is different from the height of the alveoli of the grating. This macroperforated or microperforated septum can be formed by a rear skin secured to the alveolar core of the door or by a front skin secured to the grating, in which case the blocker door has no rear skin.

It should be noted that, in this second case, the blocker doors in the reverse-jet position are not airtight and that a (very small) part of the air flow passes through the blocker doors (through the perforations in the resistive skin); this pressure drop at the blocker doors is sufficiently small to be compensated for by a suitable sizing of the braking systems (in the same way that any leakages that may exist between the blocker doors are also compensated for). The saving in mass obtained by omitting the rear skin and providing a structural frame of reduced dimensions, as well as the obtaining of a blocker door less sensitive to impacts by virtue of the combination of the reduced dimensions of the structural frame and the decoupling distance, remain preponderant compared with the drawback consisting of the pressure drop in reverse jet.

Inter-door acoustic panels 723 are secured to the grating 722 between the cavities 10. The form and the dimensions of these inter-door panels are such that they fill in all the space available between the doors and such that the perforated or microperforated front face of said inter-door panels 723 fits flush at the face 91 on the flow duct side of the doors in the direct jet position, which itself fits flush at the front face 731 of the acoustic panels 11 (or internal face 71 of the internal cowl 7), so that all the aforementioned faces are aerodynamically in line with each other to limit the drag generated in the flow duct 3. Consequently, the inter-door panels 723 are less thick compared with the acoustic panels 11 of the downstream portion 73 of the internal cowl.

By means of the grating 722, the inter-door panels 723, the alveolar core 17 of the blocker doors and the acoustic panels 11, the whole of the internal cowl 7 is treated acoustically.

Figure 10:
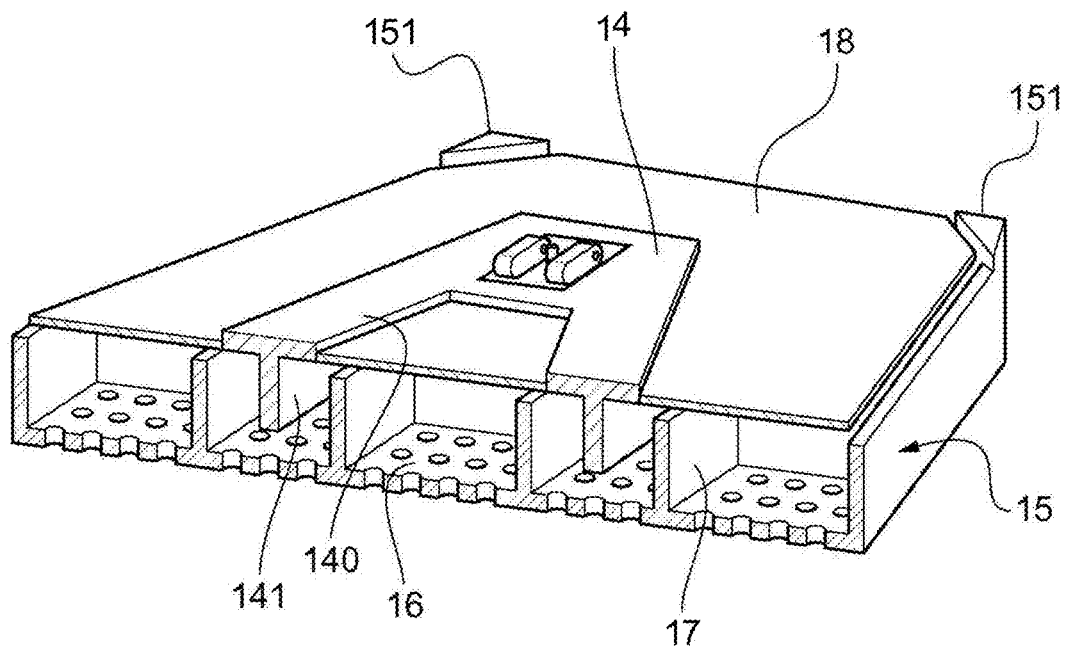
FIG. 10 is a view in cutaway perspective of a second embodiment of a blocker door according to the invention of the SDOF (the acronym of "SingleDegree of Freedom") type and including a rear skin.

FIG. 10 shows a second embodiment of a blocker door according to the invention. This embodiment differs from the first embodiment in FIGS. 3 to 7 in that it comprises a rear skin 18 covering the major part or all of the alveolar zones of the area-acoustic box 15.

For reasons of simplicity, although the structural frame of this second embodiment does not have exactly the same form (starred) as the structural frame of the first embodiment, it is marked with the same reference 14. Likewise, the reference 15 designates the aero-acoustic box of this second embodiment even if this box has partitions that do not exactly follow the same distribution or have notches different from the box of the first embodiment.

The rear skin 18 preferably extends parallel to the resistive skin 16, here in line with the internal face of the body portion 140 of the structural frame 14 of the door. In the example illustrated, the rear skin 18 is secured to the structural frame 14, for example by adhesive bonding or by any other suitable means. It could, in a variant, be secured to the aero-acoustic box 15 or form an integral part of said box, while being manufactured at the same time as the latter by additive manufacturing for example.

FIG. 10 also shows door stops 151 formed in the aero-acoustic box 15, by way of variant of the stops 150 that are secured to the structural frame in the first embodiment (FIGS. 3 and 4).

Figure 11:
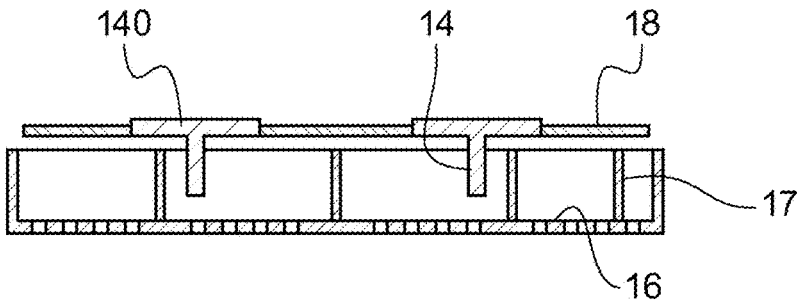
FIG. 11 is a cross section of the door of FIG. 10.

In an SDOF configuration illustrated in FIG. 11, the rear skin 18 can be solid. It then offers a sealed facing making it possible to best hold the air pressure when the door is in the reverse-jet position.

Associated with the grating 722, still in the case of a door of the SDOF type, the rear skin is preferably microperforated to provide an acoustic septum between the alveoli of the blocker door and the alveoli of the grating when the flap is in the direct-jet position.

Figure 12:
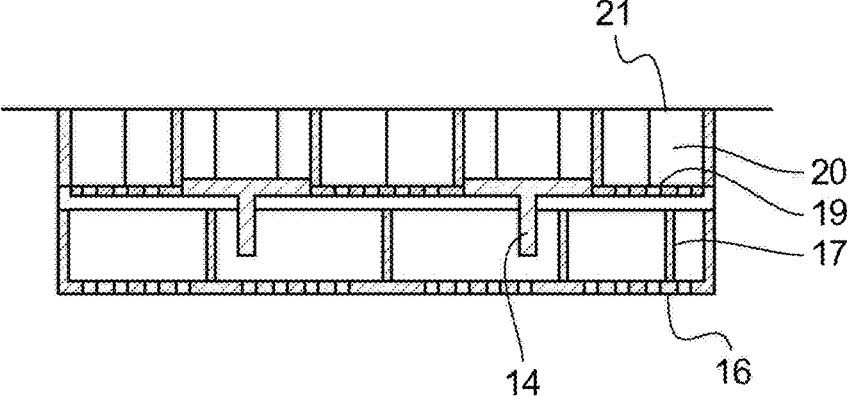
FIG. 12 is a cross section of a third embodiment of the invention, namely of a blocker door of the 2DOF (meaning "twoDegrees of Freedom") type and including a rear skin.

FIG. 12 illustrates a third embodiment corresponding to a 2DOF configuration of the blocker door. This blocker door comprises:

a first acoustic attenuation stage including
a first aero-acoustic box with a microperforated resistive skin 16 (on the flow duct side) radially extended by partitions forming a first alveolar core 17,
and a structural frame 14 decoupled from the resistive skin 16,
a second acoustic attenuation stage including a second alveolar core 20,
an intermediate wall 19 which, in the example, is secured to the structural frame 14 or to the second alveolar core 20 and extends parallel to the resistive skin 16; this intermediate wall 19 is microperforated or macroperforated to form an acoustic septum between the two acoustic attenuation stages,
optionally, a rear skin 21 that covers the second alveolar core 20.

The invention is not limited to the embodiments illustrated.

By way of example, the structural frame can have a form different from those illustrated. Its architecture may be trapezoidal in shape, or otherwise polygonal, or even include arched segments, etc, to distribute the load of the aero-acoustic box at multiple points of the structural frame. The structural frame may also be tangent to certain peripheral contours of the aero-acoustic box itself.

Moreover, the fins of the structural frame may be alternatively in an I, a T or an L, provided that they have a free edge at every point distant from the resistive skin in order to improve the tolerance of the blocker door.

The invention claimed is:

1. A blocker door for a thrust reverser, the blocker door comprising:
a structural frame configured to provide the mechanical strength of the blocker door,
an alveolar core,
an acoustically porous resistive skin intended to be located on the same side as a flow duct through which an air flow passes,
wherein:
the structural frame covers less than 50% of the surface of the resistive skin
the structural frame is held at a distance from the resistive skin, said distance hereinafter being referred to as the decoupling distance.

2. The blocker door according to claim 1, wherein the decoupling distance is greater than or equal to 1 mm, preferably greater than or equal to 2 mm, or even greater than or equal to 5 mm.

3. The blocker door according to claim 1, wherein the resistive skin is pressed against the alveolar core and is secured thereto, the resistive skin and the alveolar core forming a single-piece subassembly , hereinafter referred to as an aero-acoustic box.

4. The blocker door according to claim 1, wherein the alveolar core includes partitions that extend projecting from the resistive skin in a direction, referred to as the radial direction, corresponding to a direction of the thickness of the blocker door.

5. The blocker door according to claim 4, wherein:
the structural frame comprises a body portion extending parallel to the resistive skin, and radial fins extending projecting from the body portion in the radial direction,
the partitions of the alveolar core have notches for receiving fins of the structural frame, said notches having a bottom located at a distance from the resistive skin which, at every point on the notch, is greater than or equal to the decoupling distance, the structural frame thus fitting in the alveolar frame.

6. The blocker door according to claim 1, wherein the structural frame comprises:
two shackles extending projecting in the radial direction of the body portion,
a housing provided in the body portion on the opposite side to the resistive skin, said housing receiving a connecting rod attachment,
an aperture in said housing for a connecting rod controlling the blocker door to pass through.

7. The blocker door according to claim 1, wherein the structural frame and/or the alveolar core comprises, on the opposite side to the resistive skin, a direct-jet door stop.

8. The blocker door according to claim 7, wherein the structural frame has a roughly trapezoidal first part comprising:
a downstream plate, in which the housing receiving the connecting rod attachment and the aperture for the connecting rod controlling the blocker door to pass through are provided,
two longitudinal ribs, each having a downstream end connected to said downstream plate and an upstream end located in proximity to an upstream edge of the blocker door, the two shackles being formed at the upstream ends of said longitudinal ribs.

9. The blocker door according to claim 8, wherein the structural frame also has two tabs on either side of the downstream plate, said tabs each having an end opposite to the downstream plate provided with a door stop in direct-jet mode.

10. The blocker door according to claim 1, wherein it has no rear skin.

11. A nacelle comprising a thrust reverser of the type with screens and sliding cover, wherein the thrust reverser comprises blocker doors according to claim 1.

* * * * *